Jan. 17, 1961

A. N. OTIS, JR  2,968,727

RADIATION MEASURING APPARATUS HAVING MEANS FOR COMPENSATING
ERRORS DUE TO ATMOSPHERIC CONDITIONS

Filed April 23, 1957

INVENTOR.
ARTHUR N. OTIS, JR
BY
HIS ATTORNEY

United States Patent Office 2,968,727
Patented Jan. 17, 1961

2,968,727

RADIATION MEASURING APPARATUS HAVING MEANS FOR COMPENSATING ERRORS DUE TO ATMOSPHERIC CONDITIONS

Arthur N. Otis, Jr., New York, N.Y., assignor to Curtiss-Wright Corporation, a corporation of Delaware Filed Apr. 23, 1957, Ser No. 654,544

6 Claims. (Cl. 250—83.3)

This invention relates to radiation measuring apparatus of the type commonly used for non-contact measurement of thickness or density of continuously produced strip material, and has for its principal object an improved and precise radiation measuring apparatus of the aforesaid character that is operative automatically to compensate errors due to dynamic variations in atmospheric conditions under actual operation, such as in temperature, barometric pressure, and absolute humidity.

The thickness or density of continuously produced strip materials such as paper, plastics, metals, etc., has been indicated and/or controlled by radiation measuring apparatus wherein the material to be measured is subjected to penetrative radiation, such as from a source of beta or gamma radiation, and the unabsorbed radiation from the material is detected and measured for determining the thickness or density at the point of measurement. For convenience in terminology the source and detector combination will be referred to as the radiation instrument. Apparatus of this character has been developed to such a high degree of accuracy that differences in radiation absorption incident to change in mass of the gap medium between the source and detector (which may be due to variations in ambient temperature, barometric pressure or absolute humidity) cause material errors in measurement. For example, if it be assumed that the gap medium is air and that the atmospheric pressure and absolute humidity of the gap medium are at predetermined normal or reference values and that the temperature of the gap medium is lower than normal, then the density of the air gap, i.e. its mass, will be slightly greater than normal, thereby resulting in increased radiation absorption in the air gap with correspondingly less radiation received at the detector. Accordingly, the measurement of the material will be erroneous to the extent that greater thickness or density than for the actual case will be indicated. The same general result obtains where the gap medium pressure is higher than normal or where its absolute humidity is lower than normal. Conversely, a decrease in mass of the air gap results in increased radiation received at the detector, thereby falsely indicating that the material has less thickness or density than is actually the case.

The radiation instrument in common applications is mounted on a suitable carriage and is caused to move transversely relative to the direction of motion of the strip material with a reciprocating motion. Source and detector are caused to move in unison along a transverse section of the strip material and thus subject to measurement a profile of area, the locus of the center point of which is a "zig-zag" line extending from a first limit line near one edge of the strip material diagonally across to a second limit line near the other side, thence back to the first limit line, etc.

The strip material generally is drawn from hot calender rolls and passes through the gap between source and detector at an elevated temperature. As a rule the temperature of the calender roll surface is not uniform along either the axial or peripheral dimension. As a result the strip material emerges from the rolls with an appreciable temperature gradient from the center line to the edges. The temperature of the material, because elevated, is the predominant factor in determining the temperature and also to some extent the humidity of the gap medium. The effect of the outside ambient temperature is at most secondary. The high speed motion of the strip material induces convection currents in the gap medium resulting in continuous pressure variations therein as well. Due to the continuous reciprocating motion of the instrument the particular volume of gap medium which is effective in absorbing radiation, changes continuously and its temperature (and to some extent pressure and humidity) also change continuously. For convenience in terminology this volume will be referred to as the "effective gap." In practice the average effective gap temperature may be of the order of 100° F., and its temperature variation may be as high as 40° F. and may occur at a relatively high speed due to the rapid reciprocating movement of the radiation instrument. It is for this reason that previously proposed atmospheric condition compensated radiation instruments have not been adequately compensated to meet precision requirements becoming ever more necessary.

Some radiation instruments heretofore known have employed thermo-mechanical means for achieving compensation, for example atmospheric condition responsive bellows or temperature responsive bimetals. These condition responsive devices, even if they could physically be located in the gap, would not be too useful for precision measurements as they are inherently slowly responsive and would lag continuously behind in time in responding to the rapidly changing effective gap temperature. Moreover these devices are generally physically located outside of the gap and therefore compensate at most in changes of outside ambient atmospheric conditions. They cannot take into account the effective gap temperature changes induced by the temperature gradient of the strip material. Thus it will be seen that the need for rapidly responsive electronic (as opposed to mechanical) means for compensating is clearly indicated and in fact such means have been proposed.

The radiation detector in many applications is an ionization chamber and as such is generally connected in series circuit relation with a source of high direct voltage and a dropping resistor, commonly of the order of $10^{10}$ ohms and higher. The potential difference across this high-meg. resistor is a measure of the thickness or density of the strip material but unless compensation means are provided, it is not a precise representation of thickness or density in view of the changes in atmospheric conditions in the effective gap. These changes are also reflected as changes in the potential across the high-meg. resistor. According to one electronic scheme for compensating, a second dummy chamber and source are provided and a piece of strip material of standard thickness or density is permanently placed in the gap thereof. A similar high-meg. resistor is connected between the high potential source and the second dummy detector. The measure of thickness of the tested strip material in the actual test instrument is not the potential across its associated high-meg. resistor but the potential difference between the non-common ends of the two high-meg. resistors. This arrangement theoretically compensates for all kinds of variations such as variation in the high potential source, variations in the heater voltage of an amplifier connected to amplify the difference in potential between the two high-meg. resistors, and also atmospheric conditions, but only ambient atmospheric conditions to the outside of the two chambers and common thereto. Obviously however the arrangement does not compensate for the continuously changing temperature of the gap in the test instrument.

Another scheme for electronic compensation has been proposed which takes into account the continuous changes in atmospheric conditions in the gap of the radiation measuring instrument. It includes but a single chamber and source, but the high-meg. resistor or at least a part thereof is deliberately chosen to be responsive to atmospheric conditions and is placed within the gap. In the case of temperature compensation, a temperature sensitive resistor such as a thermistor, is selected to have a temperature coefficient of magnitude and sign so as to nullify potential drop changes in the high-meg. resistor due to temperature changes. High-meg. thermistors are not readily commercially available, are unstable in resistance value and also in temperature coefficient, are internally electrically very noisy, and if located remotely from the amplifying apparatus because situated in the gap subject the amplifier to intolerable hum and pick-up noise.

Accordingly it is another object of the invention to provide electronic temperature compensation for radiation instruments which is readily commercially available, and free from noise, hum and pick-up even though located in the gap and remote from the amplifying apparatus.

These and other objects are attained by modification of the amplifying circuitry so as to include a condition responsive circuit element, generally a resistor, which is of low value and therefore free from noise, hum and pick-up and moreover is readily commercially available. The usual amplifying circuitry for radiation instruments includes a direct voltage to alternating voltage converter such as a dynamic or "swinging" condenser. These converters are generally provided with two input terminals, one of which is connected to the high-meg. resistor and the other of which may be either grounded or connected through suitable circuit means to a source of bias potential. According to the invention these circuit means include the aforesaid low impedance condition responsive element. In a specific embodiment of the invention the condition responsive element is included in a feedback loop connecting the rectified amplifier output to an input terminal of the converter. In order to realize a high degree of sensitivity to condition change, the condition responsive circuit element is connected in a bridge circuit which in turn is inserted in the feedback loop.

The invention will be more fully set forth in the following description referring to the accompanying drawing, and the features of novelty will be pointed out with particularity in the claims annexed to and forming a part of this specification.

Referring to the drawing.

Figure 1:
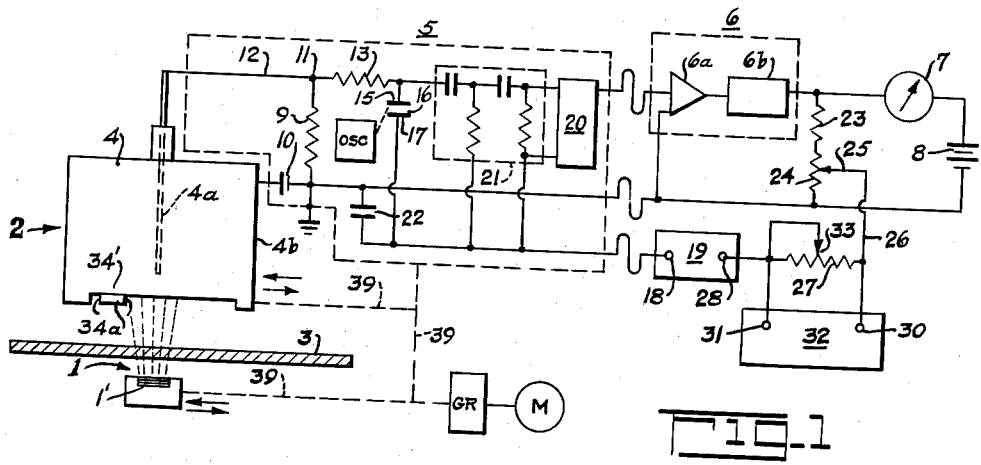
Fig. 1 is a partly diagrammatic and schematic illustration of a radiation measuring system embodying the present invention.

The radiation measuring system schematically illustrated in Fig. 1 comprises a source of radiation generally indicated at 1, and a radiation detector 2 of suitable type spaced, as indicated, by an air gap from the source. Within the air gap is disposed for continuous lengthwise movement material to be measured in respect to thickness or density, as the case may be. In the present instance the material 3 which may be paper, plastics, etc., is of strip form arranged continuously to move through the gap as it is produced. In this type of system the radiation from the source 1, which may be a radioactive isotope 1' emitting beta rays, penetrates the strip material where it is partially absorbed, depending on the mass of the material, and the unabsorbed radiation enters the detector 2. Where the character of the material requires, a source of gamma radiation may be used.

The detector 2 by way of example may comprise an ionization chamber 4 of well-known type having a probe electrode 4a and a conducting wall 4b forming the other or positive electrode. The electrodes are connected in conventional manner through circuitry 5 to an amplifier 6 which energizes a calibrated indicator 7. A source of suitable D.C. potential 8 bucks out the quiescent D.C. output potential of amplifier 6, so that the deflection of indicator 7 is related directly to change in output potential with respect to the quiescent potential, rather than to ground potential, whereby its sensitivity is improved.

The circuitry 5 is generally enclosed in a well-shielded unit which is secured to the chamber 4 although electrically insulated therefrom and grounded. As such it moves in unison with the chamber 4 and the source 1 transversely of the motion of the strip material as will be described hereinafter. The circuitry 5 includes a high-meg. resistor 9 (commonly of the order of $10^{10}$ ohms and higher) whose one end is tied to the probe 4a and whose other end is grounded. A high D.C. potential indicated at 10 is impressed between the wall electrode 4b and ground, thereby completing an external circuit with the high-meg. resistor 9 and probe 4a. The lower wall of the ionization chamber 4 is provided with suitable glass-sealed apertures (not shown) through which radiation enters the chamber causing ionization with resulting current flow through the high-meg. resistor 9 according to the intensity of radiation entering the chamber. Thus the potential difference across resistor 9 is proportional to the radiation received by the detector and the indicator 7 can be calibrated in terms thereof.

As in systems heretofore used, the radiation intensity of the source is generally fixed for a given operation at a predetermined magnitude and its distances from the material and detector are also fixed so that when material of standard thickness or density is interposed in the gap, the indicator 7 reads zero. Accordingly any deviation from the standard in either direction results in a signal of corresponding sense at the indicator 7 provided that the atmospheric conditions in the gap remained fixed.

Although a simple indicating system is illustrated, it should be understood that the signal from the amplifier 6 can be used either to indicate the departure of the thickness or density of the material 3 from a predetermined value or may also by well-known means control a recorder, as well as means governing the production of said material so as to correct the error in thickness or density. It should be understood that the arrangement of the radiation source 1, detector 2 and material 3 may be varied according to the method preferred; for example, instead of being at opposite sides of the material 3 as shown the source 1 and detector 2 may be at the same side of the material and positioned so that unabsorbed radiation is reflected or "back-scattered" into the detector.

The variations in the D.C. voltage at the junction 11 of the high-meg. resistor 9 and the wire 12 connected therefrom to the probe 4a, due to variations in the thickness or density of the material 3 and also due to changes in atmospheric conditions in the gap separating the source 1 and detector 2, are generally of the order of from a few millivolts to a few tenths of one volt. Direct coupled amplification of this signal voltage at junction 11 is not desirable due to the well-known drawbacks of instability and drift of direct coupled amplifiers. Therefore means within circuitry 5 are provided, intermediate of the junction 11 and the amplifier 6, for converting the direct voltage at junction 11 to an alternating voltage at the input of amplifier 6. Another high-meg. resistor 13, commonly of the order of $10^8$ ohms, spans junction 11 and a plate 15 of a dynamic condenser 16 whose other plate 17 is tied to a terminal 18 of a network generally indicated at 19. Network 19 includes a source of direct voltage and one or more condition responsive circuit elements more fully described hereinafter. Thus a D.C. voltage appears at plate 15 which is a function jointly of the thickness or density of the strip material 3 and the temperature (and to some extent the pressure and humidity) in the effective gap separating the source 1 and the detector 2 and another D.C. voltage appears at the plate 17 which is a function of the temperature (and if desired also of the pressure and humidity) in the effective gap and is of proper magnitude and sign to compensate for variations in the voltage at terminal 15 due to variations in atmospheric conditions in the effective gap.

The plate 17 is vibrated by an oscillator OSC as indicated so that an A.C. voltage varying in magnitude according to the difference between the two D.C. signals impressed on the plates 15 and 17 respectively, and in phase according to the predominant signal, is impressed across the input terminals of the amplifier 6. When the thickness or density of the material at a given point conforms to the standard, the two D.C. signals are equal and the A.C. signal is zero. The A.C. signal is amplified by a preamplifier 20 within unit 5 and a main amplifier 6a, and converted to a D.C. signal variable in magnitude and polarity by a phase sensitive rectifier 6b for controlling in well-known manner an indicator, recorder or other apparatus. Apparatus involving operation of a dynamic condenser of the above type is shown for example in Palevsky et al. Patent No. 2,613,236.

The output of the dynamic condenser 16 is fed to the preamplifier 20 through circuitry shown within the block 21. Circuitry 21 and also the resistor 13 are functionally similar to the corresponding circuitry shown in Fig. 4 of the aforesaid Palevsky et al. Patent No. 2,613,236 and described therein, and require no further discussion. Bypass capacitor 22 connects the plate 17 A.C. signalwise to ground.

The dynamic condenser 16 in addition to performing the function of conversion from D.C. signals to an A.C. signal also performs the function of a differential circuit means for subtracting or algebraically adding two D.C. voltages. As an alternative to the dynamic condenser 16 suitable other differential circuit means may be employed.

The output voltage of rectifier 6b is applied to a load consisting of the series connected resistors 23 and 24 connected between rectifier 6b and ground. Resistor 24 is variable for purposes of controlling the gain of the amplifier system by controlling the amount of feedback voltage derived from the wiper 25 and fed to a feedback line 26, a level control potentiometer 27, thence to the input terminal 28 of network 19, and ultimately from its output terminal 18 back to the plate 17 of the dynamic condenser 16. Thus an atmospheric condition correction voltage as well as a feedback voltage are fed to plate 17 and the inclusion of the condition responsive circuit means (within block 19) in the feedback loop is a preferred arrangement according to the invention. The resistor 27 is supplied through the terminals 30 and 31 of a regulated direct current supply 32. Potentiometer 27 is adjustable to control the level of voltage at terminal 31 and therefore also of plate 17 by means of positioning of its slider 33. The current from the supply 32 through resistor 27 is constant and independent of the setting of slider 33 and of any fluctuations, for example line voltage fluctuations, within supply 32. This current is also independent of variations in the feedback voltage on line 26 as the terminals 30 and 31 "float" with reference to ground, so that there is no loading effect on the supply 32 due to the amplifier system. The controls 24 and 33 are adjusted for a material of given standard thickness or density and at predetermined standard atmospheric conditions to cause indicator 7 to read zero.

Figure 3:
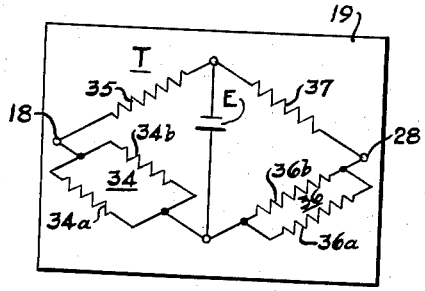
Fig. 3 is a circuit diagram of the network within block 19 of Fig. 1 effective to provide temperature compensation of the measurement apparatus of Fig. 1.

A preferred circuit arrangement for the network within block 19 of Fig. 1 is illustrated in Fig. 3. It includes a bridge network having a pair of opposite circuit junctions connected to the terminals 18 and 28 and the other pair of opposite junctions connected to the terminals of a source of constant direct voltage E.

One arm 34 of the bridge is connected to terminal 18 and includes parallel connected thermistor 34a and resistor 34b, which is relatively insensitive to temperature changes. Thermistor 34a is preferably disposed in the gap between the source 1 and detector 2, and even more preferably caused to move along in unison with source and detector to continuously sense the temperature of the effective gap. To this end thermistor 34a is also represented diagrammatically as disposed within the gap and secured to the ionization chamber 4 as at 34'. The thermistor 34a may typically have a value of 1,000 ohms at 80° F. and 500 ohms at 120° F. A thermistor of such low value is readily available commercially, dependable in operation, may be disposed in the gap and yet admit of noise-free operation. The resistor 34b may be of the order of one half the value of the value of thermistor 34a at its reference standard temperature of 80° F., i.e. 500 ohms. The other arm connected to terminal 18 consists of a resistor 35 which is relatively insensitive to temperature changes and moreover is generally of a magnitude much larger than the resistance of arm 34, typically of the order of 40,000 ohms. A third arm 36 is connected to terminal 28 and includes parallel connected resistors 36a and 36b which are relatively insensitive to temperature changes. Resistor 36b is of the same value as resistor 34b and resistor 36a is of the same value as thermistor 34a at the standard reference temperature of 80° F. The fourth arm of the bridge is also connected to terminal 28 and includes the resistor 37 which is of the same value as resistor 35. All the resistors in the bridge except thermistor 34a are subject to the ambient temperature conditions of a chassis or terminal board whereon they are mounted.

Thermistors such as 34a exhibit an exponential variation in resistance with temperature change. The variation with temperature of the gap medium density, herein air density, on the other hand is hyperbolic and for the limited region of temperature variation of the effective gap (80° F. to 120° F. for example) is approximately linear. As the change in voltage at the junction 11 with temperature at a fixed thickness or density of the material 3 is approximately linear, it is desirable to produce a temperature response at the terminal 18 which is also approximately linear. The proportioning of the bridge arms previously indicated serves to achieve such approximately linear response and the proper compensation. The resistance value of arm 35 is relatively large in magnitude compared to the value of arm 34, and therefore a relatively constant current flows through these arms independent of the variations in value of thermistor 34a. The parallel connection of thermistor 34a and resistor 34b, especially in the proportions indicated, results in an effective resistance for arm 34 which when multiplied by the aforesaid constant current through arm 35, obtains an output voltage at terminal 18 which is approximately linear with temperature variation.

The actual value of thermistor 34a and also its "temperature constant," i.e. the slope of its log resistance v. temperature straight line plot, are determined with reference to the known "system characteristic" so as to compensate for temperature variations in the effective gap. The system characteristic takes into account the known factors of characteristic absorption by the strip material and variations therein due to variations in the thickness or density thereof, of the characteristic absorption by the effective gap and changes therein due to variations in effective gap temperature, of the voltage response thereto at the plate 15 of the dynamic condenser 16, of the gain of the combined converter-amplifier-rectifier units, of the magnitude of the voltage E, etc.

With thermistor 34a properly selected with reference to the system characteristic, the indication of indicator 7 is dependent substantially solely on variations in thickness or density of the strip material 3. The bridge connection of the network 19 takes advantage of the well-known properties of bridge networks, namely no contribution due to the voltage source E under conditions of bridge balance, and highest sensitivity of such contribution due to resistance change of thermistor 34 with deviation in temperature from standard.

Figure 4:
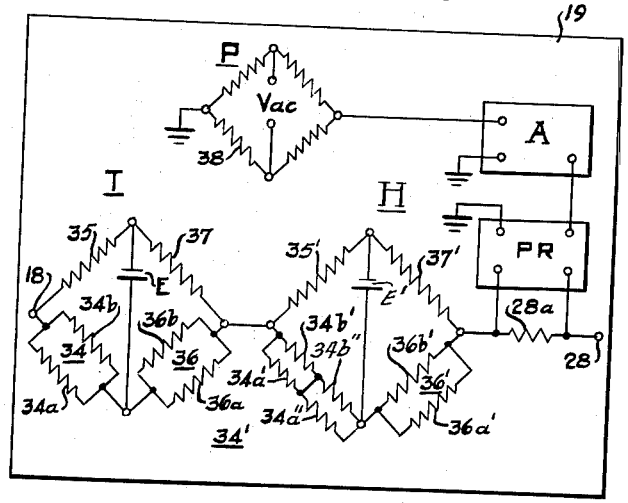
Fig. 4 is a circuit diagram of the network within block 19 of Fig. 1 effective to compensate the apparatus of Fig. 1 simultaneously for temperature, pressure and humidity effects.

Referring to Fig. 4, there is connected to the terminal 18 a bridge network T which is identical to the bridge network shown in Fig. 3, like reference characters identifying like parts. A second bridge network H is connected in tandem with bridge network T for purposes of humidity compensation. Network H is energized by the similar voltage E' and its arms 35', 37' and 36' correspond respectively to the arms 35, 36 and 37 of network T. The arm 34' of network H is somewhat modified. As shown it includes another thermistor 34a' shunted by a fixed resistor 34b' which is relatively insensitive to temperature changes. The parallel combination of elements 34a' and 34b' is connected in series with a second parallel combination of elements 34a'' and 34b''. Element 34a'' is a relative humidity responsive resistance transducer and is preferably secured along with thermistors 34a' and 34a to the chamber 4 as indicated at 34' in Fig. 1. Resistor 34b'' is fixed and relatively insensitive to temperature and humidity. All the resistors in the network H except elements 34a' and 34a'' are generally located on a chassis or terminal board and subject to ambient atmospheric conditions thereof.

Commercially available humidity transducers reflect relative humidity rather than absolute humidity. However, the response of the detector 2 is affected by the absorption of radiation by moisture, i.e. the absolute humidity content of the gap medium. It is for this reason that the second thermistor 34a' is necessary to produce a response for the bridge arm 34' representative of absolute rather than relative humidity. For example if the temperature of the effective gap were to increase and its absolute humidity also were to increase yet the relative humidity remain the same, in the absence of thermistor 34a' no change in the contribution of voltage by bridge H would occur. Transducer element 34a would be unchanged in value with constant relative humidity. The effective gap would absorb less radiation due to increase in temperature as well as due to increase in absolute humidity. This is so because the increase in water vapor is at the expense principally of nitrogen which has a higher molecular weight than water vapor. The temperature effect would be compensated for by the bridge T, but the humidity effect would not be compensated for by the bridge H.

With thermistor 34a' included, although transducer element 34a'' remains unchanged, the decrease in resistance of thermistor 34a' reflects the proper change in absolute humidity. The characteristic of the humidity transducer element 34a'' are such that with an increase in relative humidity there is nonlinear decrease in its resistance. The connection as shown is proper as with an increase in absolute humidity, i.e. with an increase in water vapor in the effective gap there is a decrease in the density of the mass of the effective gap and a decrease in the absorption thereby. This results in an increase in radiation detected by the chamber 4, an increase in ionization current and a rise in the potential at the junction 11 and at plate 15 of dynamic condenser 16. However, at the same time the value of the resistance of the transducer element 34a' decreases and the potential transmitted from bridge H to terminal 18 rises in an equal amount, so that there is no net change in the voltage difference as sensed by the dynamic condenser 16.

The transducer elements 34a' and 34a'' are selected with reference to the system characteristic, which as used with reference to Fig. 4 also takes into account the factors of absolute humidity and variations therein, so as to compensate for these variations. The resistors 34b' and 34b'' are selected to produce proper matching of the absolute humidity response of the bridge H and of the ionization current as reflected at the plate 15.

The connection from bridge network H to the terminal 28 is completed by means of a resistance 28a across which is applied a pressure correction voltage from a phase sensitive rectifier PR. To this end a pressure transducer bridge P is provided and includes a pressure transducer resistive element 38 which is preferably also secured to the chamber 4 to sense pressure changes in the effective gap. The bridge P is energized by an alternating voltage $V_{ac}$ in view of the low sensitivity of pressure transducers rendering direct voltage operation and attendant direct coupled amplification undesirable. As shown the bridge P supplies a signal representative of deviation of pressure from standard to an alternating voltage amplifier A whose output in turn is rectified by the phase sensitive rectifier PR, and as rectified supplied across resistor 28a. The output terminals of the rectifier PR "float" with respect to ground and therefore produce no loading effect on the feedback loop exterior to terminals 18 and 28. The resistive transducer element 38 and also resistor 28a are selected with reference to the system characteristic so as to compensate for pressure variations in the effective gap. The system characteristic as used with reference to Fig. 4 also takes into account the response of bridge P and the gain of amplifier A and phase sensitive rectifier PR.

The bridges T, H and P are balanced at respective predetermined standard atmospheric conditions and are effective to insert voltages into the feedback loop according to deviations from standard. Thus it is seen that in the form of invention as shown in Fig. 4 suitable practicable means for simultaneous compensation for temperature, absolute humidity, and pressure effects in the effective gap are provided.

Figure 2:
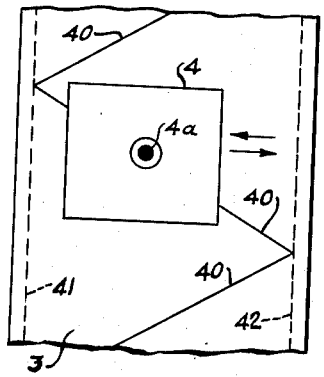
Fig. 2 is a top plan view indicating relative scanning and material movements of the radiation instrument and strip material respectively in Fig. 1.

A motor M drives in unison source 1, chamber 4, unit 5 and thermistor 34a (and possibly also transducer elements 34a', 34a'', and 38) through the intervening agency of a gear reducer GR and connections generally indicated at 39. If it is desired to produce a linear translatory reciprocal motion of source and chamber, suitable cams or linkages may be included in the connections 39 for conversion from the uniform rotary motion of the motor M. Fig. 2 illustrates the relative movement of the strip material with respect to the scanning movement of the measuring instrument. Line 40 illustrates the locus of the mid-point of the limited area of strip material actually subjected to measurement at any given instance. As shown, lines 41 and 42 which are parallel to the edges of the strip material 3 define the limit of line 40. As previously pointed out it is the scanning movement of the radiation instrument and the attendant temperature gradient in the effective gap which has rendered the problem of accurate compensation so acute, for which problem a practical solution has been provided as described herein.

It should be understood that the aforegoing has been presented by way of illustration and not by way of limitation, reference being had to the appended claims rather than the aforegoing description to determine the scope of the invention.

What is claimed is:
1. Apparatus for measuring the thickness or density of continuously produced strip material comprising a source of penetrative radiation disposed so as to direct a radiant beam at said strip, a radiation detector disposed for reception of radiation unabsorbed by said material and by the medium in the effective gap between said source and detector, first circuit means connected in circuit with said detector for producing a first electrical signal in accordance with the detected radiation, said signal being variable according to a first predetermined relation with changes in said material thickness or density and according to a second predetermined relation with changes in an atmospheric condition in said effective gap reflected as change in mass of said medium, second circuit means for producing a second electrical signal variable in accordance with changes in an atmospheric condition in said effective gap including a transducer element having an impedance variable with said atmospheric condition changes according to a third predetermined relation dissimilar to said second relation, said second circuit means further including a second impedance connected in parallel with said transducer element whereby to match the net relation of said second signal with said second relation, means for amplifying the difference of said first and second signals and producing in turn an electrical signal representative substantially solely of the thickness or density of said material, and means for utilizing the last-mentioned electrical signal.

2. Apparatus for measuring the thickness or density of continuously produced strip material comprising a source of penetrative radiation disposed so as to direct a radiant beam at said strip, a radiation detector disposed for reception of radiation unabsorbed by said material and by the medium in the effective gap between said source and detector, first circuit means connected in circuit with said detector for producing a first electrical signal in accordance with the detected radiation, said signal being variable according to a first predetermined relation with changes in said material thickness or density and according to a second predetermined relation with changes in an atmospheric condition in said effective gap reflected as change in mass of said medium, second circuit means for producing a second electrical signal variable in accordance with changes in said atmospheric condition in said effective gap including a transducer element having an impedance variable with said atmospheric condition changes according to a third predetermined relation dissimilar to said second relation, said second circuit means further including a second impedance effective to match the net relation of said second signal with said second relation, means for amplifying the difference of said first and second signals and producing in turn an electrical signal representative substantially solely of the thickness or density of said material, means for utilizing the last mentioned electrical signal, and a degenerative feedback loop connected from the output to the input of said amplifying means and including said second circuit means.

3. Apparatus as specified in claim 2 wherein the second circuit means comprises a bridge network with the transducer circuit element and the second impedance included in an arm thereof, a pair of opposite junctions of said network being connected in the feedback loop and including means for applying a fixed voltage across the other pair of opposite junctions.

4. Apparatus as specified in claim 3 wherein the transducer element is a temperature responsive resistor of relatively low value, and the second impedance is resistive.

5. Apparatus as specified in claim 3 wherein an arm of the bridge network includes as the condition responsive element a relative humidity resistive transducer and the aforesaid second impedance being resistive, and also includes as a secondary condition responsive transducer element a temperature responsive resistor to render said bridge network responsive to variations in absolute humidity in the effective gap.

6. Apparatus as specified in claim 5 provided with resistance means included in the arm containing the temperature responsive resistor for matching the response of the bridge network to the absolute humidity response of radiation absorption by the effective gap medium as reflected by the aforesaid second relation.

References Cited in the file of this patent

UNITED STATES PATENTS

| | | |
|---|---|---|
| 2,790,945 | Chope | Apr. 30, 1957 |
| 2,800,590 | Gilman | July 23, 1957 |
| 2,800,591 | Gilman | July 23, 1957 |
| 2,829,268 | Chope | Apr. 1, 1958 |